(12) United States Patent
Hotz

(10) Patent No.: US 7,293,916 B2
(45) Date of Patent: Nov. 13, 2007

(54) LINEAR GUIDANCE DEVICE

(75) Inventor: Bruno Hotz, Schwieberdingen (DE)

(73) Assignee: Bosch Rexroth AG, Stuttgart (DE)

( * ) Notice: Subject to any disclaimer, the term of this patent is extended or adjusted under 35 U.S.C. 154(b) by 670 days.

(21) Appl. No.: 10/830,170

(22) Filed: Apr. 22, 2004

(65) Prior Publication Data

US 2004/0223671 A1    Nov. 11, 2004

(30) Foreign Application Priority Data

Apr. 24, 2003    (DE) ................................ 103 18 612

(51) Int. Cl.
*F16C 29/06*    (2006.01)
*F16C 33/00*    (2006.01)
(52) U.S. Cl. .......................................... 384/45; 384/15
(58) Field of Classification Search .................. 384/45, 384/15
See application file for complete search history.

(56) References Cited

U.S. PATENT DOCUMENTS

| 3,403,947 A | | 10/1968 | Johnson | |
|---|---|---|---|---|
| 3,785,418 A | * | 1/1974 | Hennig et al. | ............... 160/202 |
| 3,845,993 A | * | 11/1974 | Schiler | ......................... 384/45 |
| 4,828,402 A | | 5/1989 | Osawa | |
| 5,575,566 A | | 11/1996 | Faulhaber | |
| 5,622,433 A | * | 4/1997 | Suzuki et al. | .................. 384/45 |
| 6,012,846 A | * | 1/2000 | Lambertz et al. | .............. 384/15 |
| 6,629,779 B1 | * | 10/2003 | Mischler et al. | ............... 384/15 |

FOREIGN PATENT DOCUMENTS

| DE | 1 695 557 | 3/1955 |
|---|---|---|
| DE | 38 12 505 A1 | 11/1988 |
| DE | 43 11 641 C1 | 4/1994 |

OTHER PUBLICATIONS

Patent Abstracts of Japan 04093147 A, Mar. 25, 1992.
Patent Abstracts of Japan 09303393 A, Nov. 25, 1997.

* cited by examiner

*Primary Examiner*—Thomas R. Hannon
*Assistant Examiner*—Justin Krause
(74) *Attorney, Agent, or Firm*—Michael J. Striker

(57) ABSTRACT

A linear guidance device has an elongated guiding rail having at least one throughgoing opening extending from the upper surface for receiving a mounting element for mounting the guiding rail on a lower component. A guidance car is displaceably guided on the guiding rail in a longitudinal direction of the guiding rail. A cover band can be attached to an upper surface of the guiding rail, the cover band formed so that a limiting line of a free end of the cover band is formed so that when a point of the cover band coincides with a boundary line of the throughgoing opening in a selected direction, a portion of the limiting line is arranged completely outside of a boundary line of the throughgoing opening.

9 Claims, 5 Drawing Sheets

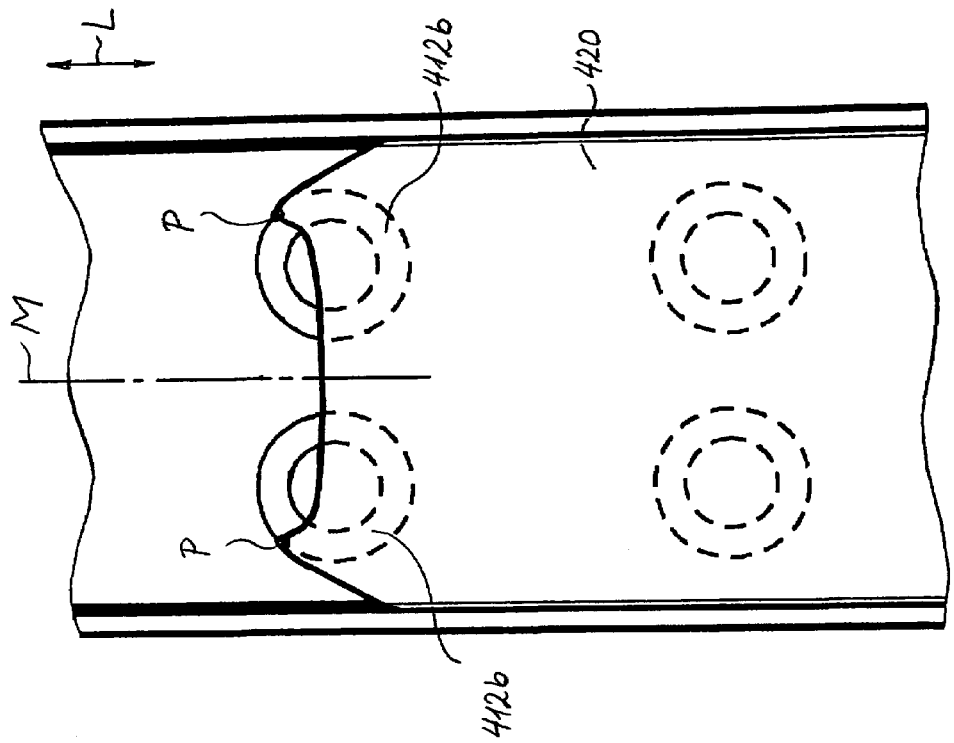
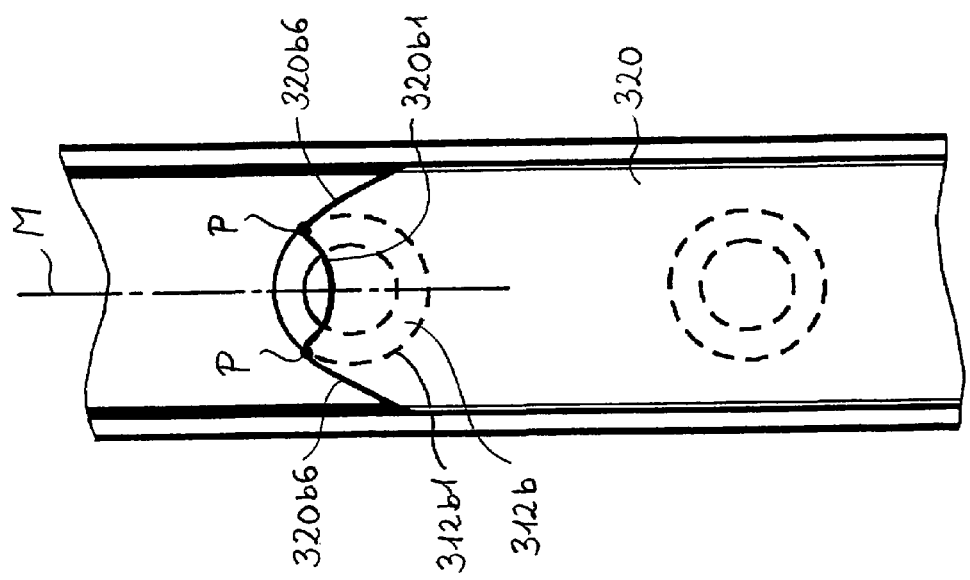

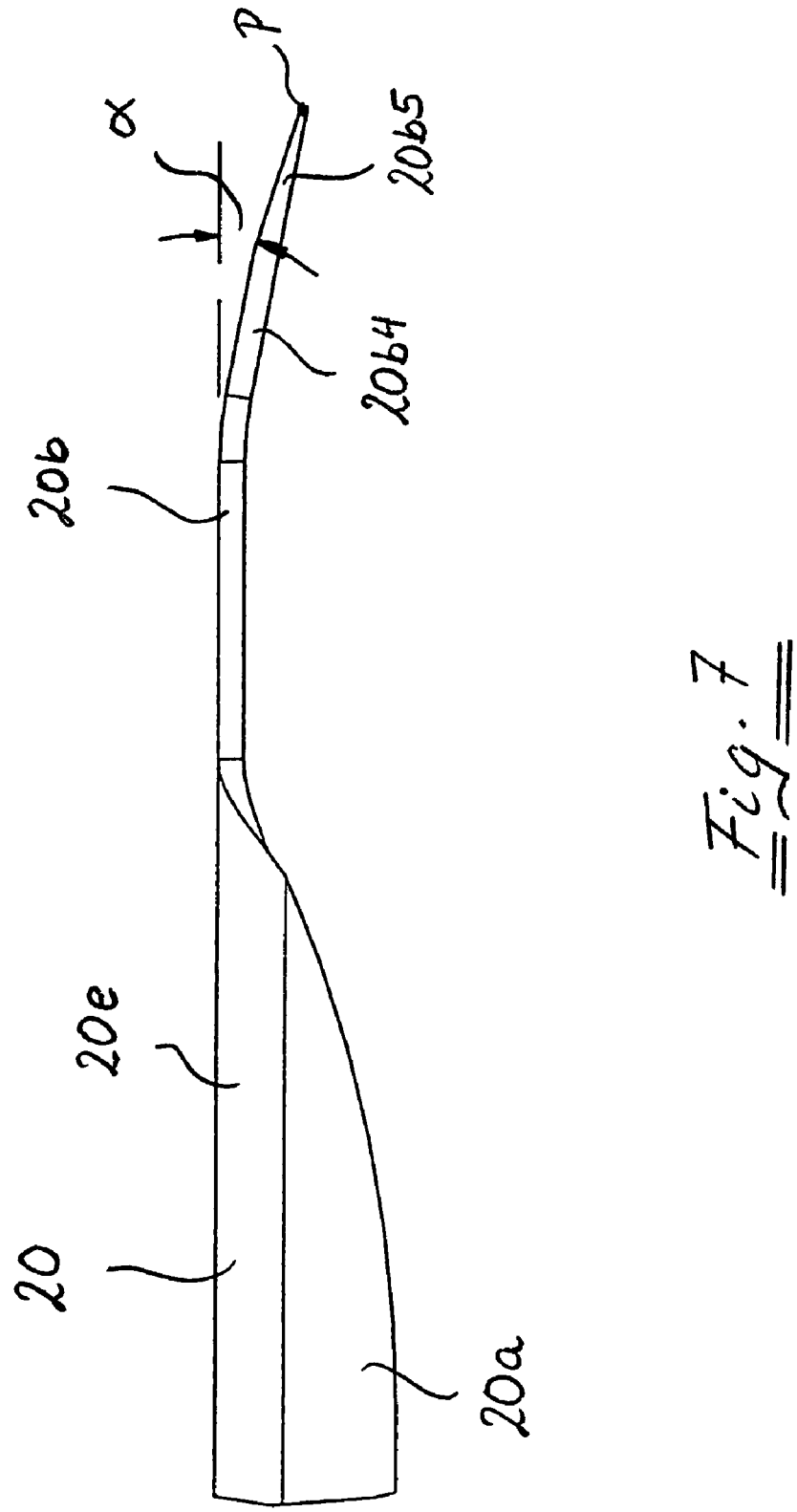

LINEAR GUIDANCE DEVICE

BACKGROUND OF THE INVENTION

The present invention relates to linear guiding devices. More particularly, it relates to a linear guidance device which has an elongated guiding rail with an upper surface and at least one throughoing opening extending from the upper surface for receiving a mounting element for mounting the guiding rail on a higher order unit, a guidance car displaceably guided on the guiding rail in its longitudinal direction, and a cover band attachable to the upper surface of the guiding rail and covering the at least one throughgoing opening.

Such a linear guiding device in which the throughgoing openings for receiving the mounting elements for the guiding rail is covered with a cover band is disclosed for example in the German patent document DE 43 11 641 C1. Occasionally it happens that in such a linear guidance device, the cover band must be applied on the guiding rail in the condition in which the guidance car is already located on the guiding rail. In this case the cover band can not be clamped on the guiding rail, but instead must be displaced on the guiding rail from its end side. It is to be understood that during passage through the region covered by the guidance car, the seal which seals the guiding rail against the guiding rail must not be damaged. The cover band therefore must be placed as flat as possible on the guiding rail. It has been shown in practice that because of this flat placement, the outwardly extending free end of the cover band may come into engagement with and can be locked in the throughgoing openings for receiving the mounting elements of the guiding rail.

SUMMARY OF THE INVENTION

Accordingly, it is an object of the present invention to provide a linear guidance device which is a further improvement of the existing guiding devices.

More particularly, it is an object of the present invention to provide a linear guidance device which is formed so that the cover band can be fitted on the guiding rail without problems when the guidance car is located on the guiding rail.

In keeping with these objects and with others which will become apparent hereinafter, one feature of the present invention resides, briefly stated in a linear guidance device in which a limiting line of at least one free end of the cover band is formed so that when a point of the cover band arranged in a longitudinal direction of the guiding rail at a greatest distance forwardly is aligned with the boundary line of a throughgoing opening in a direction extending substantially orthogonally to the cover band plane, a portion of the limiting line extending from the point at its side facing away from the longitudinal center line of the cover band is arranged completely outside the boundary line of the throughgoing opening.

The term the "limiting line" of the free end of the cover band means the end-side peripheral edge of the cover band which connects both longitudinal edges of the cover band with one another. The term "forwardly" means the sliding direction of the cover band onto the guiding rail. Further, it should be mentioned that in the preceding observation only the forward half of the boundary line of the throughgoing opening is relevant, since contrary to the rearward half only this forward half can pose the danger of locking of the limiting line of the cover band. In addition, the preceding observation is true not only when the limiting line of the cover band has a single point arranged at the greatest distance forwardly, but also when several such points are available.

With the inventive design of the limiting line of the free end of the cover band is guaranteed that this limiting line is in such interaction with the boundary line of the at least one throughgoing opening, that the free end of the cover band finely slides over the throughgoing opening and is not locked in it. If at all the forward portion of the free end of the cover band is "dipped" in the throughgoing opening, then with this engagement it is additionally guaranteed that in the process of the sliding of the cover band onto the guiding rail it is again lifted from the throughgoing opening.

When the point arranged at the greatest distance forwardly is located on the longitudinal central line and only a single longitudinal row of throughgoing openings is provided, then the limiting line extends completely outside the boundary line.

In accordance with a preferable embodiment of the present invention, the limiting line of the cover band can have at least one circular-arc shaped portion, whose radius is greater than the radius of the boundary line of the at least one throughgoing opening. In addition, or alternatively, it is also possible that the limiting line of the cover band has at least one rectilinearly extending portion. The limiting line of the cover band can be formed for example substantially completely circular-arc shaped or can be formed by combination of at least one rectilinearly extending portion with at least one circular-arc shaped portion, or can be formed polygonal.

For placement of the cover band and in particular of its free end on the guiding rail as flat as possible, in accordance with a further embodiment of the present invention it is proposed that at least one part of the free end of the cover band is formed angularly with respect to a main portion of the cover band toward the guiding rail. This is especially advantageous for minimization of the risks of a damage of the seal which seals the guidance car relative to the guiding rail. The bending angle can have a value of between about 5° and about 10°.

The smooth passage of the cover band through the region of the guiding rail covered by the guidance car can be further facilitated when the thickness of the at least one part of the free end of the cover band is reduced when compared with a thickness of a main portion of the cover band, and preferably is formed in the narrowing fashion.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIGS. 2-6 are plan views of a guiding rail provided with the inventive cover band;

FIG. 7 is a side view of the cover band of the inventive linear guidance device; and FIG. 8 is a view similar to the views of FIGS. 2-6 for illustration of a cover band in accordance with the prior art.

DESCRIPTION OF THE PREFERRED EMBODIMENTS

Figure 1:
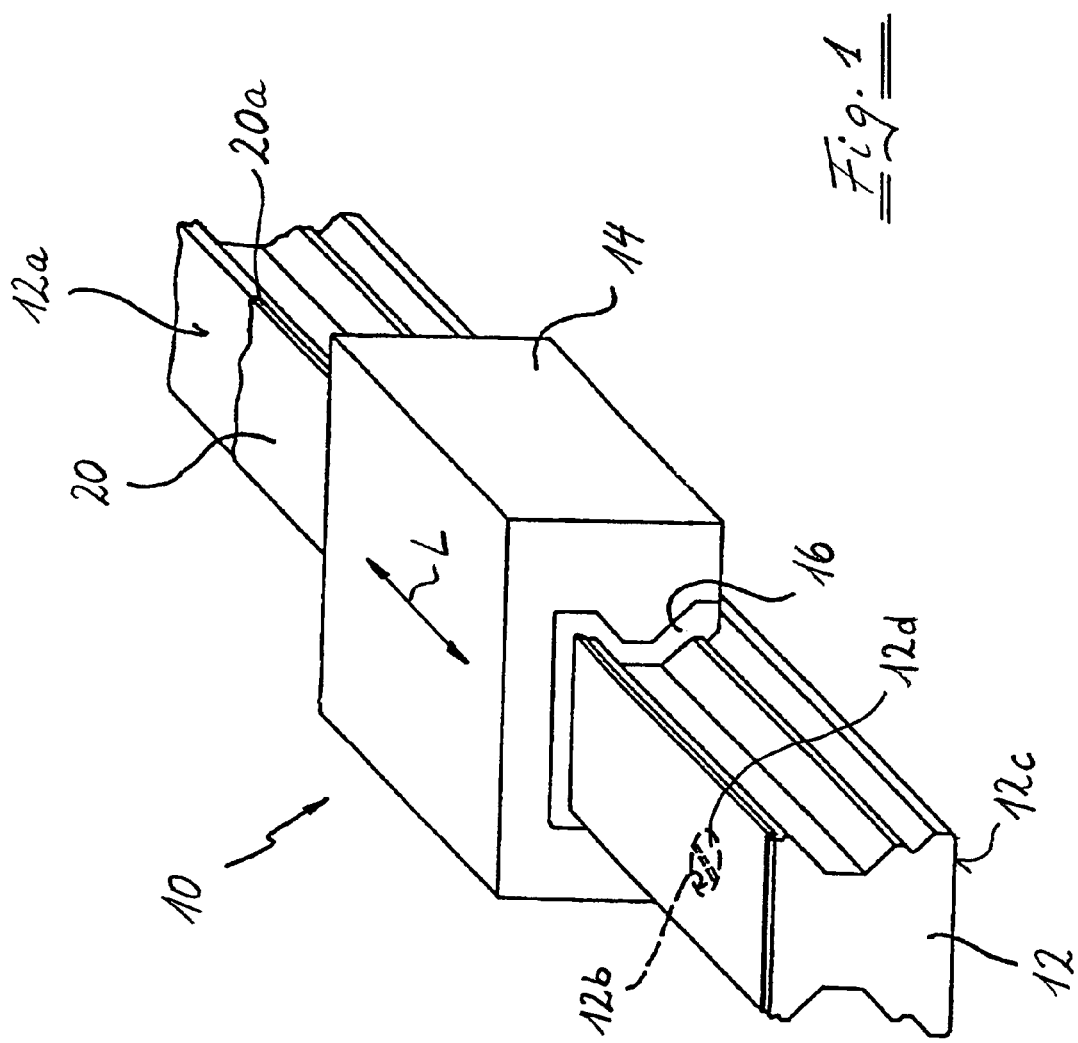
FIG. 1 is a perspective view of a linear guidance device, in which a cover band in accordance with the present invention may be used.

A linear guiding device in accordance with the present invention is identified as a whole with reference numeral 10. It includes a guiding rail 12 and a guidance car 14 which is reciprocatingly displaceable on the guiding rail 12 in direction of its longitudinal extension L. A plurality of throughgoing openings 12b open in the upper surface 12a of the guiding rail 12. They extend from the upper surface 12a to the lower surface 12c of the guiding rail 12. Mounting screws 12d can be inserted in them for mounting of the guiding rail 12 on a lower component. In FIG. 1 one such throughgoing opening 12b is shown.

For providing a smooth upper surface for running of the guiding rail 12 over by the guidance car 14, a cover band 20 is arranged on the upper surface 12a on the guiding rail 12 and covers the throughgoing openings 12b. An unintentional lifting of the cover band 20 from the guiding rail 12 is prevented by two bent peripheral flanges 20a which cooperate in a known manner with the guiding rail in a form-locking manner, as disclosed for example in the German patent document DE 43 11 641 C1, and form the peripheral edges of the cover band 20.

It should be further mentioned that the guidance car 14 is sealed relative to the guiding rail 12 by a seal 16.

As shown in FIGS. 2-6, the free end 20b of the cover band 20 in accordance with the present invention is formed so that its limiting line 20b1 which connects the peripheral edges of the cover band 20, when its point P arranged at the greatest distance forwardly is aligned with the boundary line 12b1 of the throughgoing opening 12b in a direction O orthogonal to the cover band plane (FIG. 2) and thereby also to the upper plane 12a, a portion 20b6 of the limiting line 20b1 which extends from the point P at a side facing away from the longitudinal central line M of the cover band 20, is arranged completely outside of the boundary line 12b1 of the throughgoing opening 12b.

Figures 2, 3:
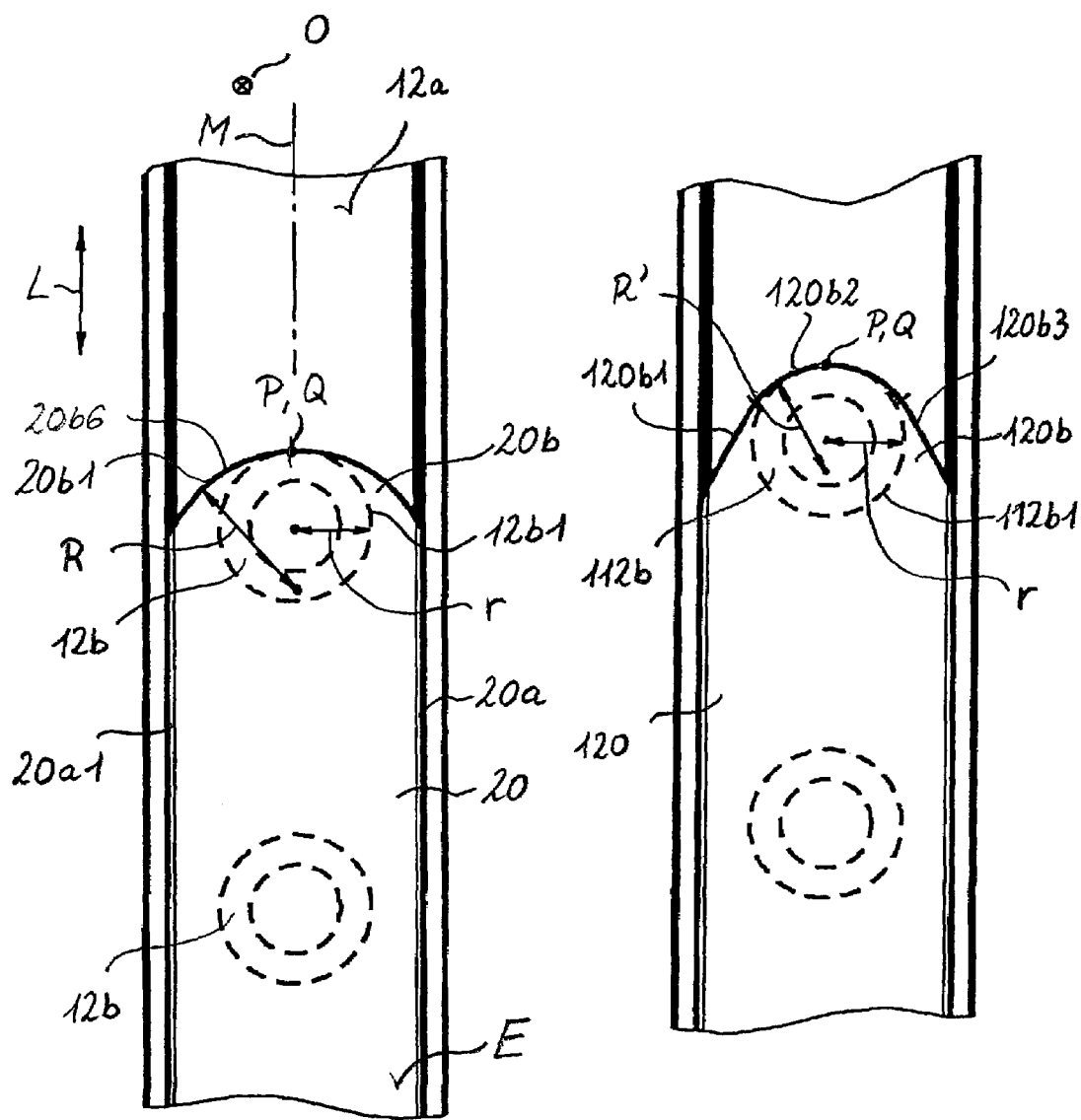

In the embodiment of the invention shown in FIG. 2 this is obtained for example in that the limiting line 12b1 of the free end 20b of the cover band 20 is formed substantially completely circular-arc shaped, and the radius R of this circular arc is greater than the radius r of the boundary line 12b1 of the throughgoing opening 12b.

Since in accordance with the embodiment shown in FIG. 2, the point P is arranged on the longitudinal central line M and thereby coincides with the point Q of the boundary line 12b1 which is arranged at the greatest distance forwardly, the total limiting line 20b1 extends completely outside of the boundary line 12b1 of the throughgoing opening 12.

As shown in FIG. 3, the limiting line 120b1 of the free end 120b of the cover band 120 does not have to be formed completely circular-arc shaped. Moreover, it can be formed by a combination of at least one circular-arc shaped portion 120b2 and at least one rectilinear portion 120b3, as long as they are located completely outside of the boundary line 112b1 of the throughgoing opening 112b when the points P and Q are aligned. Again, the radius R' of the circular arc portion 120b2 is greater than the radius r of the boundary line 112b1 of the throughgoing opening 112b.

Figures 4, 8:
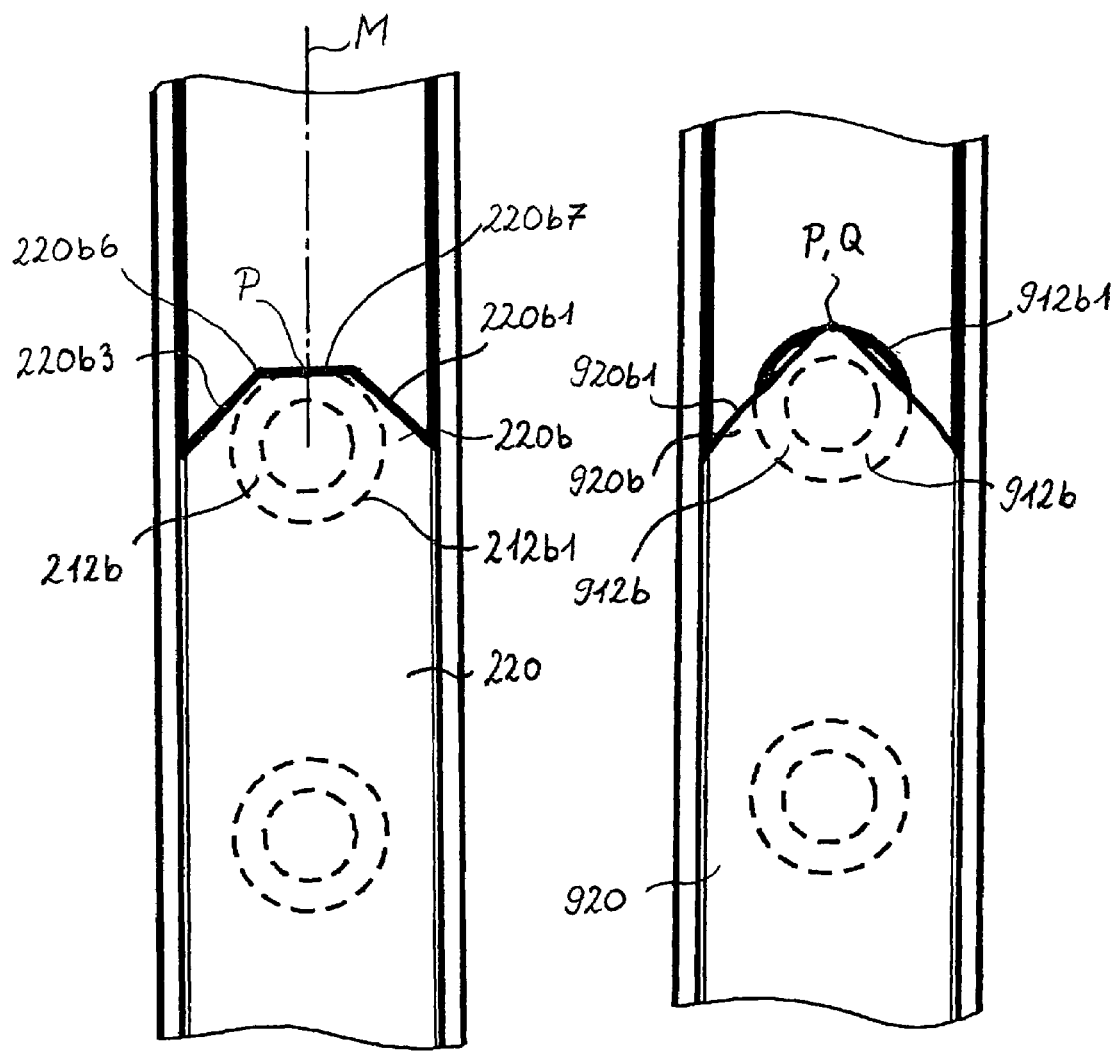

Finally, as shown in FIG. 4, the limiting line 220b1 of the free end 220b of the cover plate 220 can be also assembled of a plurality of rectilinear portions 220b3, or in other words to have a polygonal course, as long as the above mentioned condition with respect to the boundary line 212b1 of the throughgoing opening 212b for alignment of the points P and Q is fulfilled.

In the embodiment of FIG. 5, the cover band 320 has two points P arranged at the greatest distance forwardly. For each of these two points P it is true that a portion 320B6 of the limiting line 320B1 which extends from the point P at its side which faces away from the longitudinal central line M of the cover band 320, is arranged completely outside of the boundary line 312B1 of the throughgoing opening 312B.

The concept that with the consideration of the inventive teaching also with availability of a plurality of the points P located at a greatest distance forwardly, a locking of the cover band in the throughgoing opening can be avoided, can be generalized also with an endless number of the points P located at the greatest distance forwardly, as can be seen for example from the embodiment shown in FIG. 4. Here the limiting line 220B1 of the cover band 220 has a portion 220B7 extending orthogonal to the longitudinal central line M of the cover band 220. Each point of this portion 220B7 is a point P of the cover band 220 which is at the greatest distance forwardly and for each of these points the inventive condition is true that when it is aligned with the boundary line 220B1 of the throughgoing opening 212B, a portion 220B6 of the limiting line 220B1 extending from this considered point P at its side facing away from the longitudinal central plane M is arranged completely outside of the boundary line 212B1 of the throughgoing opening 212B.

The embodiment shown in FIG. 6 is different from the embodiment shown in FIG. 5 only in that two rows of throughgoing openings 412B arranged side by side in a longitudinal direction L are provided. In this case again the cover band 420 can be formed according to the inventive concept so that there is no danger of locking of the cover band 420 in the throughgoing openings 412B. In other respects, the description of the embodiment of FIG. 5 can be used for this embodiment as well.

When the inventive cover bands 20, . . . , 420 in accordance with FIGS. 2-6 are compared with the cover band 920 of prior art shown in FIG. 8, the technical effect of the inventive idea is especially clear. Upon alignment of the point P with the boundary line 912b1, the limiting line 920b1 of the free end 910b of the cover band 920 extends from the point P partially inside the boundary line 912b1 of the throughgoing opening 912b. Thereby the free end 920b of the cover band 920 is formed so sharp that it can easily lock in the throughgoing opening 912*b*.

Since the free end 20*b* of the cover band 20, with the limiting line 20*b*1 formed in accordance with the present invention, during the sliding of the cover band 20 onto the guiding rail 12 finely slides over its throughgoing openings 12*b*, as shown in FIG. 7, it is possible in accordance with the present invention to form at least one portion 20*b*4 of this free end 20*b* angled towards the guiding rail 12, when compared with the main portion 20*e* of the cover band. This angling can have an angle α with a value of between approximately 5° and approximately 10°. By this angling the free end 20*b* of the cover band 20 and in particular its angled portion 20*b*4 is pressed against the outer surface 12*a* of the guiding rail 12 and engages during entry into the region of the guiding rail 12 covered by the guidance car 14 under the seal 16 without the danger of damaging the seal 16.

This substantially interaction-free engagement under the seal 16 is further improved in the embodiment shown in FIG. 7, in that the angled portion 20*b*4 of the free end 20*b* of the cover band 20 is at least partially narrowed toward the forward-most point P as identified in FIG. 7 at reference numeral 20*b*5.

It will be understood that each of the elements described above, or two or more together, may also find a useful application in other types of constructions differing from the types described above.

While the invention has been illustrated and described as embodied in a linear guidance device, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

The invention claimed is:

1. A linear guidance device, comprising:
   an elongated guiding rail having an upper surface and at least one throughgoing opening extending from said upper surface for receiving a mounting element for mounting said guiding rail on a lower component;
   a guidance car displaceably guided on said guiding rail in a longitudinal direction of said guiding rail;
   a cover band attached to an upper surface of said guiding rail and covering said at least one throughgoing opening, said cover band being formed so that a limiting line of at least one of free ends of said cover band is formed so that when a point of the cover band which is located in said longitudinal direction of said guiding rail at a greatest distance forwardly coincides with a boundary line of said at least one throughgoing opening in a direction extending substantially orthogonally to a plane of said cover band, a limiting line portion extending from said point in a direction away from a longitudinal central plane of said cover band is arranged completely outside of a boundary line of said throughgoing opening.

2. A linear guidance device as defined in claim 1, wherein said limiting line has at least one rectilinearly extending portion.

3. A linear guidance device as defined in claim 1, wherein said at least one part of said free end of said cover band has a tapered shape.

4. A linear guidance device, comprising:
   an elongated guiding rail having an upper surface and at least one throughgoing opening extending from said upper surface for receiving a mounting element for mounting said guiding rail on a lower component;
   a guidance car displaceably guided on said guiding rail in a longitudinal direction of said guiding rail;
   a cover band attached to an upper surface of said guiding rail and covering said at least one throughgoing opening, said cover band being formed so that a limiting line of at least one of free ends of said cover band is formed so that when a point of the cover band which is located in said longitudinal direction of said guiding rail at a greatest distance forwardly coincides with a boundary line of said at least one throughgoing opening in a direction extending substantially orthogonally to a plane of said cover band, a limiting line portion extending from said point in a direction away from a longitudinal central plane of said cover band is arranged completely outside of a boundary line of said throughgoing opening,
   wherein said limiting line, when said point of said cover band arranged at the greatest distance forwardly is arranged on said longitudinal central plane of said cover band, is arranged completely outside of said boundary line of said throughgoing opening.

5. A linear guidance device, comprising:
   an elongated guiding rail having an upper surface and at least one throughgoing opening extending from said upper surface for receiving a mounting element for mounting said guiding rail on a lower component;
   a guidance car displaceably guided on said guiding rail in a longitudinal direction of said guiding rail;
   a cover band attached to an upper surface of said guiding rail and covering said at least one throughgoing opening, said cover band being formed so that a limiting line of at least one of free ends of said cover band is formed so that when a point of the cover band which is located in said longitudinal direction of said guiding rail at a greatest distance forwardly coincides with a boundary line of said at least one throughgoing opening in a direction extending substantially orthogonally to a plane of said cover band, a limiting line portion extending from said point in a direction away from a longitudinal central plane of said cover band is arranged completely outside of a boundary line of said throughgoing opening,
   wherein said limiting line has at least one circular-arc shaped portion with a radius which is greater than a radius of said boundary line of said at least one throughgoing opening.

6. A linear guidance device, comprising:
   an elongated guiding rail having an upper surface and at least one throughgoing opening extending from said upper surface for receiving a mounting element for mounting said guiding rail on a lower component;
   a guidance car displaceably guided on said guiding rail in a longitudinal direction of said guiding rail;
   a cover band attached to an upper surface of said guiding rail and covering said at least one throughgoing opening, said cover band being formed so that a limiting line of at least one of free ends of said cover band is formed so that when a point of the cover band which is located in said longitudinal direction of said guiding rail at a greatest distance forwardly coincides with a boundary line of said at least one throughgoing opening in a direction extending substantially orthogonally to a plane of said cover band, a limiting line portion extending from said point in a direction away from a longitudinal central plane of said cover band is arranged completely outside of a boundary line of said throughgoing opening, wherein said limiting line is formed substantially circular-arc shaped.

7. A linear guidance device, comprising:
an elongated guiding rail having an upper surface and at least one throughgoing opening extending from said upper surface for receiving a mounting element for mounting said guiding rail on a lower component;
a guidance car displaceably guided on said guiding rail in a longitudinal direction of said guiding rail;
a cover band attached to an upper surface of said guiding rail and covering said at least one throughgoing opening, said cover band being formed so that a limiting line of at least one of free ends of said cover band is formed so that when a point of the cover band which is located in said longitudinal direction of said guiding rail at a greatest distance forwardly coincides with a boundary line of said at least one throughgoing opening in a direction extending substantially orthogonally to a plane of said cover band, a limiting line portion extending from said point in a direction away from a longitudinal central plane of said cover band is arranged completely outside of a boundary line of said throughgoing opening, wherein at least a part of said free end of said cover band is formed angled to said guiding rail relative to a main portion of said cover band.

8. A linear guidance device as defined in claim 7, wherein said angled part has an angle of substantially between 5° and 10°.

9. A linear guidance device, comprising:
an elongated guiding rail having an upper surface and at least one throughgoing opening extending from said upper surface for receiving a mounting element for mounting said guiding rail on a lower component;
a guidance car displaceably guided on said guiding rail in a longitudinal direction of said guiding rail;
a cover band attached to an upper surface of said guiding rail and covering said at least one throughgoing opening, said cover band being formed so that a limiting line of at least one of free ends of said cover band is formed so that when a point of the cover band which is located in said longitudinal direction of said guiding rail at a greatest distance forwardly coincides with a boundary line of said at least one throughgoing opening in a direction extending substantially orthogonally to a plane of said cover band, a limiting line portion extending from said point in a direction away from a longitudinal central plane of said cover band is arranged completely outside of a boundary line of said throughgoing opening, wherein at least one part of said free end of said cover band has a thickness which is reduced when compared with a thickness of a main portion of said cover band.

* * * * *